United States Patent
Hogreve (10) Patent No.: US 10,088,381 B2
(45) Date of Patent: Oct. 2, 2018

(54) METHOD AND DEVICE FOR CONDUCTING AN INTEGRITY TEST ON A FLEXIBLE TEST CONTAINER

(71) Applicant: Sartorius Stedim Biotech GmbH, Goettingen (DE)

(72) Inventor: Marc Hogreve, Adelebsen (DE)

(73) Assignee: Sartorius Stedium Biotech GmbH (DE)

( * ) Notice: Subject to any disclaimer, the term of this patent is extended or adjusted under 35 U.S.C. 154(b) by 262 days.

(21) Appl. No.: 15/063,621

(22) Filed: Mar. 8, 2016

(65) Prior Publication Data

US 2017/0205307 A1    Jul. 20, 2017

(30) Foreign Application Priority Data

Jan. 15, 2016 (DE) .................. 10 2016 000 365

(51) Int. Cl.
*G01M 3/04* (2006.01)
*G01M 3/20* (2006.01)

(52) U.S. Cl.
CPC ..................... *G01M 3/04* (2013.01)

(58) Field of Classification Search
CPC ............ G01M 3/00; G01M 3/02; G01M 3/04; G01M 3/20
See application file for complete search history.

(56) References Cited

U.S. PATENT DOCUMENTS 3,487,677 A    1/1970  Molitor
5,386,717 A    2/1995  Toda
2009/0173144 A1*  7/2009  Lukens ............... G01M 3/229
                                               73/40.7
2017/0292894 A1* 10/2017  Decker ............... G01M 3/3218

FOREIGN PATENT DOCUMENTS

| DE | 1957719 A1 | 5/1971 | |
|---|---|---|---|
| DE | 102014013522 A1 | 3/2016 | |
| JP | S5961738 A | 4/1984 | |
| WO | WO 2005054806 A1 * | 6/2005 | ............ G01M 3/226 |

OTHER PUBLICATIONS

German Office Action dated Nov. 7, 2016.

* cited by examiner

*Primary Examiner* — Nguyen Ha
(74) *Attorney, Agent, or Firm* — Gerald E. Hespos; Michael J. Porco; Matthew T. Hespos (57) ABSTRACT

A method for conducting an integrity test on a flexible test container (1) includes arranging the test container (1) in an examination container (5) that is sealable in a fluid-tight manner, providing negative pressure in the interior of the sealed examination container (5), filling examination fluid into the test container (1) arranged in the examination container (5), detecting examination fluid present in the interior of the examination container (5), and providing negative pressure in the test container (1) arranged in the examination container (5) prior to filling the examination fluid. Prior to filling the examination fluid, the negative pressure in the test container (1) is lower than the negative pressure in the interior of the examination container (5), and the pressure difference between the negative pressure in the test container (1) and the negative pressure in the interior of the sealed examination container (5) is more than 0 mbar and a maximum of 100 mbar.

14 Claims, 5 Drawing Sheets

METHOD AND DEVICE FOR CONDUCTING AN INTEGRITY TEST ON A FLEXIBLE TEST CONTAINER

BACKGROUND

1. Field of the Invention

The invention relates to a method and a device for conducting an integrity test on a flexible test container.

2. Description of the Related Art

Hermetically sealed flexible bags, such as plastic bags, are often used particularly in bioprocessing. In many applications, flexible bags are used for accommodating cell culture solutions, blood reserves, solutions for bioreactors, etc. In particular in bioprocessing, use is often made of sterilized containers that are to remain sterile during use.

In order to be able to detect a damaged container, which is thus unsuitable for sterile use, the flexible container may be subjected to leak testing and/or integrity testing prior to its use. Here, a flexible test container to be inspected is filled with an examination gas and arranged in a sealable examination container. A vacuum is created in the examination container. If the test container has a leak, the examination gas will pass through the leak, due to the pressure difference between the test container and the examination container, and can be detected in the examination container.

If no examination gas is detected in the examination container, the test container will pass the leak test and/or integrity test. If examination gas is detected in the examination container, the test container is not suitable for use as a sterile container.

It is the object of the invention to improve the performance of an integrity test on a flexible test container.

The object is solved by the subject matters of the independent claims. The dependent claims relate to preferred embodiments.

SUMMARY

A first aspect relates to a method for conducting an integrity test on a flexible test container, wherein the test container is arranged in an examination container that is sealable in a fluid-tight manner, negative pressure is provided in the interior of the sealed examination container, examination fluid is filled into the test container arranged in the examination container, detected the interior of the examination container is checked with respect to the presence of examination fluid, negative pressure is provided in the test container arranged in the examination container prior to the examination fluid being filled, the negative pressure in the test container is designed to be lower than the negative pressure in the interior of the examination container, and the pressure difference between the negative pressure in the test container (1) and the negative pressure in the interior of the sealed examination container (5) is more than 0 mbar and a maximum of 100 mbar.

With the above method, it is possible to check the integrity of the test container, in particular to detect a leak of the test container. The test container used is a test container with flexible walls, such as a plastic bag. The test container may have an opening at at least one point, via which opening the examination fluid can be introduced into the test container. To this end, the opening of the test container may have a coupling for coupling to a supply line.

To conduct the method, the test container is arranged in the examination container that is sealable in a fluid-tight manner. The interior of the examination container is larger than the test container in its unfolded form, so that the test container can be introduced into the examination container without creasing.

Alternatively, the test container may be supported with a supporting device in the examination container, which is permeable to the examination fluid, and complete unfolding can therefore be prevented. The examination container may have walls of a dimensionally stable material, such as metal walls, which withstand a high vacuum. To receive the test container, the examination container can be opened and subsequently be sealed in a fluid-tight manner again. The examination container may have suitable seals at its openable point.

After the test container has been arranged in the interior of the examination container, the examination container is sealed again and negative pressure is created in the interior of the examination container. In particular during a test period in which the test container is supplied with the examination fluid, the negative pressure may refer to a pressure drop or pressure difference between the interior of the examination container and the test container filled with examination fluid. During this test period, the pressure in the interior of the examination container may be lower than the pressure in the test container filled with examination fluid. The negative pressure in the test container and/or in the examination container may particularly refer to negative pressure with respect to atmospheric pressure.

In particular, the negative pressure may be provided by means of an examination container pump, which sucks off air from the sealed examination container. To this end, the examination container pump may be connected to the interior of the examination container via lines. Thus, the negative pressure in the examination container may be provided by a vacuum, for example, in particular a high vacuum. The higher the negative pressure with respect to the test container filled with examination fluid, the more reliably a leak of the test container can be detected.

The negative pressure in the examination container may be set to a value between 5E-2 mbar and 1E-1 mbar, for example.

The examination fluid is filled into the test container while the test container is located in the examination container. Preferably, the examination fluid is filled into the test container after negative pressure has been created in the interior of the examination container. The examination fluid may be supplied into the opening of the test container from an examination fluid source via a supply line. The examination fluid source may be arranged outside or inside the examination container.

Here, the term examination fluid refers to an examination gas and/or examination liquid. The examination fluid may particularly be formed as an examination gas, which is not, or only to a small extent, present in the normal air mixture. In this way, it is prevented that a leak of the test container is erroneously assumed when residual air is detected in the examination container. Helium may be used as the examination fluid, for example.

The test container may be filled with the examination fluid up to a predetermined and/or predeterminable test pressure.

If the test container has a leak, part of the examination fluid will enter the interior of the examination container through the leak due to the pressure difference between the interior of the examination container and the test container filled with the examination fluid. The interior of the examination container is checked with respect to the presence of examination fluid. In doing so, it is particularly checked whether examination fluid has entered the interior of the examination container through a leak of the test container. In this way, it is possible to check if and/or to what extent an examination fluid concentration in the examination container increases. In this examination, in addition to the determination as to whether examination fluid is present in the examination container at all, it is also possible to determine the concentration level of examination fluid in the interior of the examination container e.g. depending on the time passed.

If an increase in examination fluid concentration is detected in the interior of the examination container, which exceeds a predetermined and/or predeterminable threshold value, the test container will not pass the integrity test. For example, a predetermined low diffusion through the flexible walls of the test container may be allowed, which leads to a slight increase in examination fluid concentration in the interior of the examination container. If the examination fluid concentration in the interior of the examination container exceeds a predetermined and/or predeterminable threshold value within a predetermined period of time though, the test container will be classified as poor. Depending on the evaluation method, the development of the examination fluid concentration in the examination container may be determined and compared to an expected target development of examination fluid concentration in intact test containers.

Tests have shown that the test container may possibly be damaged when such a leak test is conducted. In particular when the negative pressure is provided in the examination container, the flexible test container may expand very strongly. Here, the test container may be damaged.

However, during the process, negative pressure is provided in the test container arranged in the examination container prior to the examination fluid being filled. In this way, the test container is prevented from being damaged when negative pressure is provided in the examination container. The negative pressure in the test container is set such that its level may substantially correspond to the negative pressure in the examination container. However, the negative pressure in the test container is designed to be continuously lower than the negative pressure in the examination container by a few mbar (millibar), in particular between 0 mbar and 100 mbar lower, preferably between 0 mbar and 20 mbar. Thus, there is a pressure difference between the negative pressure in the interior of the test container and the interior of the examination container. Collapsing of the test container and thus a potential inclusion of residual air can be prevented in this way. Here, the expression that the negative pressure in the test container is "lower" than the negative pressure in the examination container means that the absolute pressure in the test container is designed to be a few mbar (i.e. between 0 mbar and 100 mbar) higher than the absolute pressure in the examination container.

For example, the pressure difference may be in the one-digit mbar range in order to keep mechanical stress on the test container as low as possible. Alternatively, the pressure difference between the negative pressure in the interior of the test container and the interior of the examination container may also be larger than 10 mbar, e.g. if the examination container includes a mechanical support for the test container. In any of the mentioned cases, the pressure difference may be smaller than an intended maximum test pressure for the test container.

During the provision of the negative pressures, the pressure difference may be monitored and/or set such that the pressure difference is as small as possible. Here, the absolute pressure in the examination container is never larger than the absolute pressure in the test container. If need be, only the absolute pressure in the test container is allowed to be a few mbar (e.g. between 0 mbar and 100 mbar) larger than the absolute pressure in the examination container. In one embodiment, however, the two pressures may at least temporarily be equally large.

An alternative embodiment may also provide that during the provision of the negative pressures, the absolute pressure in the test container must always be a few mbar larger than the absolute pressure in the examination container. Here, during the provision of the negative pressures, the pressure difference is designed to be continuously between 0 mbar and 100 mbar, preferably between 0 mbar and 10 mbar.

The negative pressure in the test container may be provided via a test container pump, which pumps off the interior of the test container via its test container opening. The negative pressure in the test container may refer to negative pressure with respect to atmospheric pressure.

The negative pressure in the test container with respect to atmospheric pressure may be e.g. half as strong as the negative pressure in the interior of the examination container with respect to atmospheric pressure in order to significantly reduce the risk of the test container being damaged while the method is being conducted.

By this method, the number of waste test containers as test objects is reduced. By setting high standards on the sterility of the test containers, the wastage rate may be relatively high, which is why reducing the wastage involves a clear financial benefit.

During a test period in which the test container is supplied with the examination fluid, the absolute pressure in the interior of the examination container may be designed to be lower than the absolute pressure in the test container filled with the examination fluid.

According to one embodiment, the negative pressure in the test container is provided (e.g. directly) prior to the examination fluid being filled into the examination container such that the negative pressure in the test container is between 0 mbar and 10 mbar, preferably from 1 mbar to 10 mbar, particularly preferably from 1 mbar to 5 mbar, lower than the negative pressure provided in the examination container. Here, mechanical stress on the test container is kept as small as possible, while collapsing of the test container is prevented.

According to one embodiment, the negative pressure in the test container is provided before and/during the negative pressure in the interior of the examination container is provided. Thereby, inflation of the test container during the provision of the negative pressure in the examination container is prevented. In particular, the negative pressure in the test container may be provided at least partly at the same time as the negative pressure in the examination container, whereby the load on the test container is reduced particularly strongly. In other words, a negative pressure in the interior of the sealed examination container and the test container arranged in the examination container can be provided at the same time.

According to one embodiment, the negative pressure in the test container and the negative pressure in the interior of the examination container are provided substantially at the same time, wherein during provision of the two negative pressures, the negative pressure in the test container is continuously lower than the negative pressure in the interior of the sealed examination container by between 0 mbar and 100 mbar, preferably between 0 mbar and 10 mbar. Here, during the entire period in which the negative pressures are created, collapsing of the test container is prevented and unintended inclusion of air is avoided at the same time.

According to one embodiment, during provision of the negative pressures in the test container and in the examination container, the level of the negative pressure in the test container is matched to the level of the negative pressure in the examination container. Here, for example both negative pressures may be monitored and/or controlled actively, both negative pressures may be created via a common vacuum pump, and/or during the pumping process, an isolation valve between the two interiors may be opened. In particular, it may be intended and provided that a pressure difference upper limit between the pressure in the interior of the examination container and the pressure in the interior of the test container be observed. For example, this pressure difference upper limit may be provided and/or designed such that the absolute pressure in the interior of the test container is allowed to be maximally 10 mbar or maximally 5 mbar higher than the absolute pressure in the interior of the examination container.

Moreover, it may be intended and/or provided that a pressure difference lower limit between the pressure in the interior of the examination container and the pressure in the interior of the test container be observed. For example, this pressure difference lower limit may be provided and/or designed such that the absolute pressure in the interior of the test container must be at least 0 mbar or 1 mbar higher than the absolute pressure in the interior of the examination container.

Here, said pressure difference can be monitored, set and/or controlled at least until filling of the examination fluid begins. Even after the test container has been filled with the examination fluid, i.e. during the actual test measurement, can be pressures in the test container and in the examination container still be matched to each other.

According to a further development of this embodiment, during provision of the negative pressures in the test container and in the examination container, for example temporary pressure compensation takes place between the interior of the test container and the interior of the examination container. This may be accomplished by temporarily opening an insolation valve between said two interiors. By the temporary pressure compensation, for example, a harmfully high pressure difference between said two interiors is avoided. It can be ensured here that no residual air remains trapped in the test container. As long as the pressure is at least balanced, this may take place automatically, as at least a marginal pressure increase occurs in the interior of the test container due to trapped residual air, which prevents the test container from collapsing. By such temporary pressure compensation, at least a mean pressure difference between 0 mbar and 100 mbar, or between e.g. 0 mbar and 100 mbar can be set.

Matching between the negative pressure in the interior of the test container and the negative pressure in the interior of the examination container may take place by matching between an examination container pump for pumping off the interior of the sealed examination container and a test container pump for pumping off the interior of the test container. In this way, e.g. during operation, at least one of said two pumps can be controlled such that the negative pressures in the two interiors are matched to each other. Matching may take place based on the dependencies between the pressures in the interior of the examination container and of the test container as described in the paragraphs above. Controlling of said at least one pump may include throttling, temporary switch-off, and/or increasing of pump performance.

Alternatively or in addition, temporary pressure compensation may be achieved by means of an isolation valve. Here, the isolation valve is arranged such that it separates the interior of the examination container from the interior of the test container. The isolation valve may be arranged in a corresponding connecting line. The isolation valve is controllable and can be opened and closed.

Here, in particular a pulsating pressure compensation may take place, in which the isolation valve is alternately opened and closed. That is, the isolation valve can be opened repeatedly and/or temporarily to set the desired and/or predetermined pressure difference between the examination container and the test container (at least averaged over time) without setting a complete pressure compensation between the two containers. At least averaged over time in a period in which the two negative pressures in the two containers are provided through to the filling of the examination fluid, a mean pressure difference between the two containers can be provided, said pressure difference corresponding to the above described desired and/or predetermined pressure difference. Here, inclusion of residual air can be reduced and/or avoided.

According to one embodiment, a substantially equally high negative pressure is provided in the test container and in the examination container, which however in the test container may be continuously lower by a few mbar (e.g. between 0 mbar and 100 mbar) in order to prevent a collapse of the test container and thus a potential inclusion of residual air.

According to one embodiment, the examination fluid is filled into the test container out off a preloaded examination fluid source. By releasing the examination fluid into the test container, the test pressure may be created almost immediately. This is particularly advantageous for the use of examination gases such as helium, which have very small atom or molecule sizes and therefore permeate through the walls of the test container 1 very quickly. Therefore, the main measurement can be started very quickly.

According to one embodiment, the process is terminated prematurely and the test container is rated to be defective as soon as the examination fluid concentration in the examination container exceeds a predetermined leak limit. Here, the process may be terminated prior to expiry of an actually scheduled test period in order to avoid an increased contamination of the examination container with the examination fluid, with time and examination fluid being saved at the same time. The premature termination may take place alternatively or in addition due to a pressure difference measurement. In general, in the run-up to the test or parallel thereto, a pressure difference measurement may be conducted for a gross leak test.

According to one embodiment, an examination fluid background concentration in the examination container is increased when a background leak rate in the examination container falls below a predetermined leak limit. Increasing the background concentration in the examination container may be an additional method step during the process if the background leak rate in the examination container falls below a predetermined leak limit. In this additional method step, the examination fluid background concentration in the examination container is increased. This can reduce the time needed to meet start conditions and thus to conduct the process.

According to one embodiment, the negative pressure in the test container is provided via a supply line, via which the examination fluid is filled into the test container as well. Here, at least the supply part that is subsequently arranged at the test container is used for two purposes. The supply line may be coupled to the opening of the test container and exhibit a split to a test container pump for providing the negative pressure on the one hand, and to an examination fluid source for filling the examination fluid on the other hand. The test container pump and/or the examination fluid source may be arranged outside the examination container. Individually controllable valves for the individual line portions may be provided for control purposes. By using the same supply line to the test container, one keeps the number of supply lines required overall as small as possible.

According to one embodiment, the interior of the examination container is flushed after examination fluid has been detected in the examination container. If an object to be tested, i.e. a test container, is defective, examination fluid from the test container will enter the interior of the examination container. To prevent the examination container from being damaged by contamination with examination fluid, it will be cleaned by flushing after a test container has been tested to be defective. After a test container with integrity has been tested, flushing is not necessarily required and may be omitted. In this way, the interior of the examination container only needs to be flushed after a test in which a test container has been rated to be defective.

According to one embodiment, a background concentration of examination fluid is set in the examination container. Possibly, providing the negative pressure in the examination container may take a long time, in particular in the case of a gas release from the test container. In this case, the background leak rate may decrease significantly. Even though this has a rather positive effect on the performance of the integrity test in principle, the dynamic increase of the leak rate at the beginning of the measurement can be changed thereby though. Depending on the evaluation method of the integrity test, it may be advantageous that the background leak rate at the beginning of the measurement be in a predetermined range and/or window. If this predetermined range is fallen below, examination fluid may be introduced into the examination container, for example. Thereby, the background concentration of examination fluid in the examination container will be set actively prior to the start of the measurement for examining the integrity of a test container.

A second aspect relates to a test device for conducting an integrity test on a flexible test container, comprising an examination container that is sealable in a fluid-tight manner, in which the test container is arrangeable, an examination container pump for pumping off the interior of the sealed examination container, an examination fluid source, from which examination fluid can be filled into the test container arranged in the examination container, an examination fluid detector for detecting examination fluid in the interior of the examination container, and a pump connection, via which the interior of the test container arranged in the examination container can be pumped off such that the negative pressure in the test container is designed to be lower than the negative pressure in the interior of the sealed examination container, wherein the pressure difference between the negative pressure in the test container and the negative pressure in the interior of the sealed examination container is more than 0 mbar and a maximum of 100 mbar.

The examination fluid source may be formed as an examination fluid container that includes an examination fluid reserve, which can be filled into the test container via a supply line. In particular, the examination fluid source may be arranged outside the examination container and only be connected to the interior of the examination container via a supply line through a wall of the examination container. In the examination container, an opening of the test container can be coupled to a supply line connection of this supply line.

The pump connection may be arranged in the interior and/or exterior of the examination container and may be formed and provided to be connected to an opening of the test container. To this end, the pump connection can have a suitable coupling. Via the pump connection, the interior of the test container can be connected to a test container pump, via which negative pressure can be provided in the interior of the test container. Preferably, the test container pump is arranged outside the examination container, which enables a compact size of the examination container.

The pump connection may be formed as a supply line connection, so that the interior of the test container can be pumped off, and later be filled with the examination fluid, via a double-function connection and/or a double-function supply line. The test device may have one or more valves via which a supply line from the examination container pump to the interior of the examination container, a supply line from the test container pump to the interior of the test container, a supply line from the examination fluid source to the interior of the test container etc. can be controlled and/or monitored.

Moreover, the test device may have a control for controlling the valves and/or pumps of the test device. The control may have a computer processor. The control may in particular be formed and/or used to monitor, adjust and/or control the pressure difference between the test container and the examination container.

In particular, the test device allows providing negative pressure in the examination container and in the test container at the same time, which in the test container may be continuously lower by a few mbar (e.g. between 0 mbar and 100 mbar or between 0 mbar and 10 mbar) in order to prevent the test container from collapsing.

In one embodiment, the test device comprises an isolation valve between the interior of the test container and the interior of the examination container. Pressure compensation can be accomplished via the isolation valve, which reduces stress on the test container when the negative pressures are differently strong.

Any residual air inclusions in a collapsed test container may cause a marginal pressure difference, which may lead to a complete evacuation of the test container.

A third aspect relates to the use of the test device according to the second aspect and for conducting an integrity test on a flexible test container according to the method of the first aspect.

The invention will be described in the following on the basis of the embodiments illustrated in the figures. Individual aspects of the embodiments illustrated in the figures may be combined with other embodiments.

DETAILED DESCRIPTION

Figure 1:
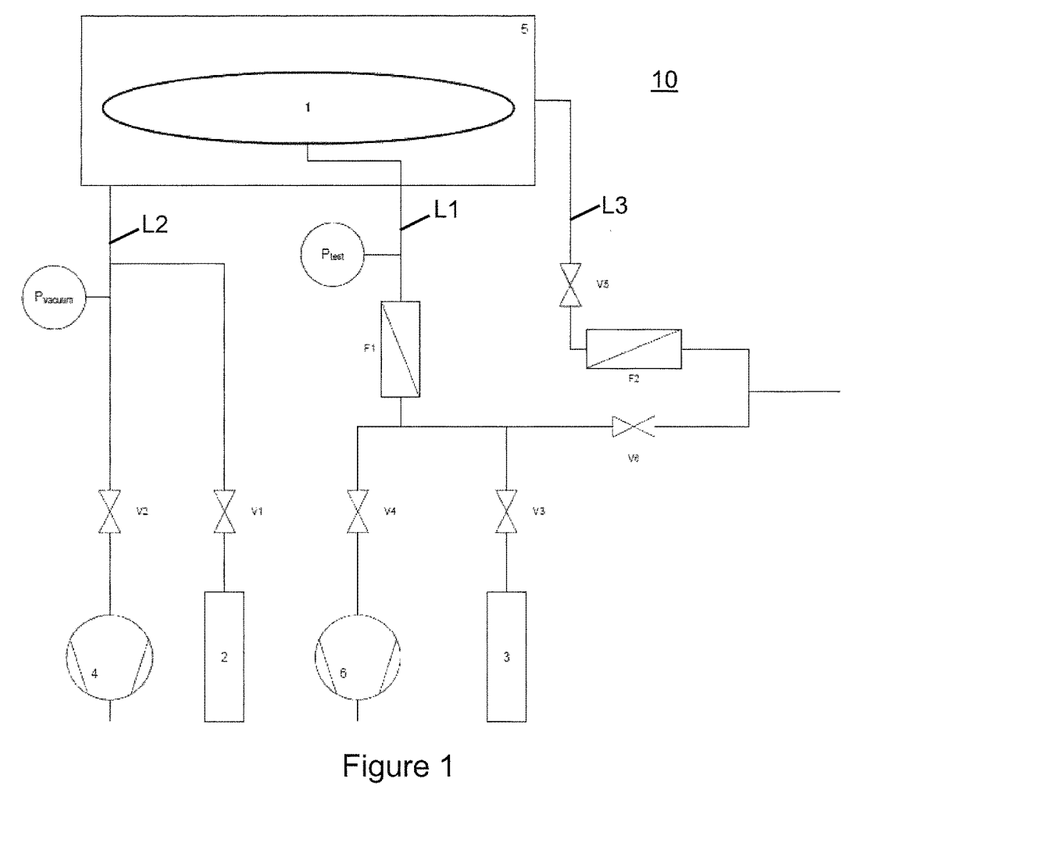
FIG. 1 a schematic illustration of a first test device for conducting an integrity test on a flexible test container.

FIG. 1 shows a schematic illustration of a first test device 10 for conducting an integrity test on a flexible test container 1.

The test device 10 comprises an examination container 5, which is formed to be openable and sealable in a fluid-tight manner. The examination container 5 may be formed to be dimensionally stable and comprise metal and/or plastic walls for example. The examination container 5 is formed and provided to withstand negative pressure, in particular a vacuum, in its interior. An opening (not shown in FIG. 1) of the examination container 5 may comprise seals to ensure fluid-tight closing.

The flexible test container 1 is arranged in the examination container 5 in a removable way. The examination container 5 may comprise a mechanical support, in particular an abutment surface matched to the test container 1, on which the test container 1 can be placed in a substantially crease-free way. The mechanical support may be formed of a porous material, whereby blocking of a leakage of the test container can be prevented by the support.

The flexible test container 1 may be formed as an individual container or as an assembly of several containers, which are connected to each other by means of tubes, for example. The test container 1 is formed to be flexible at least in part.

The test container 1 comprises an opening that is coupled to a test container supply line L1. Via the test container supply line L1, fluids can be fed to or pumped out of the interior of the test container 1. The test container supply line L1 leads to the exterior of the examination container 5 through an opening in the examination container wall of the examination container 5.

The interior of the examination container 5 is connected to two supply lines, i.e. to an examination container supply line L2 and to an air tube L3. The interior of the examination container 5 can be connected to an examination container pump 4 via the examination container supply line L2 and an examination container pump valve V2. Moreover, the interior of the examination container 5 can be connected to an examination fluid detector 2 via the examination container supply line L2 and a detector valve V1. The examination fluid detector 2 suitable for the examination fluid used serves to detect the examination fluid exiting the test container 1 in the case of a leak in the test container 1.

The examination fluid detector 2 is formed and provided to detect the concentration of a predetermined examination fluid in the interior of the examination container 5.

The examination container pump 4 may be formed as a high vacuum pump, which can evacuate the interior of the examination container 5 to high vacuum with a pressure of maximally 10-3, e.g. to provide a very low background leak rate in the examination container 5. A low background leak rate allows a fast measurement. The smaller the background leak rate in the examination container 5, the clearer the dynamic behavior of the leak rate through the test container 1 in the case of a defect of the test container 1 at the beginning of the measurement. Such a dynamic increase in examination fluid concentration in the interior of the examination container 5, in particular prior to a permeation through side walls of the test container 1, can be evaluated to detect a leak in the test container 1.

A test container filter F1, which is formed as a particle filter and inhibits a particle flow through the test container supply line L1, is arranged in the test container supply line L1.

Via the test container supply line L1 and a test container pump valve V4, the interior of the test container 1 can be connected to a test container pump 6, which can create negative pressure, in particular a vacuum, in the test container 1.

The test container pump 6 is formed and provided to cause an evacuation of the test container 1 simultaneously to the evacuation of the examination container 5, whereby too high positive pressure in the test container 1 and thus a damage can be avoided. Here, the test container pump 6 can be controlled such that the absolute pressure in the test container 1 is constantly higher than the absolute pressure in the examination container by just a few mbar (e.g. between 0 mbar and 100 mbar), in order to prevent a collapse of the test container and thus a potential inclusion of residual air. At the end of the test, the test container pump 6 can be used evacuate the examination fluid from the test container 1 again.

Further, the interior of the test container 1 can be connected to an examination fluid source 3 via the test container supply line L1 and an examination fluid valve V3. In this way, the test container 1 can be filled with an examination fluid, in particular an examination gas, such as inert gas. To this end, an examination fluid reserve is arranged in the examination fluid source 3. The examination fluid source 3 may be formed as a reservoir. The examination fluid in the examination fluid source 3 may be preloaded under a predetermined and/or predeterminable test pressure to almost immediately create the test pressure by releasing the examination fluid into the test container 1. This is particularly advantageous for the use of examination gases such as helium, which have very small atom or molecule sizes and therefore permeate through the walls of the test container 1 very quickly. Therefore, the main measurement can be started as quickly as possible.

The interior of the examination container 5 can be vented via the vent line L3. Venting can be controlled via an examination container vent valve V5 arranged in the vent line L3. Moreover, an examination container filter F2 is arranged in the vent line, which may be formed as a particle filter.

The interior of the test container 1 can be vented via a test container vent valve V6 and the test container supply line L1.

The test device 10 shown in FIG. 1 serves to conduct an integrity test on the flexible test container 1. The test container 1 can be exchanged and is not part of the test device 10. Instead, the test device 10 can be reused for examining a plurality of different flexible test containers.

Figure 3:
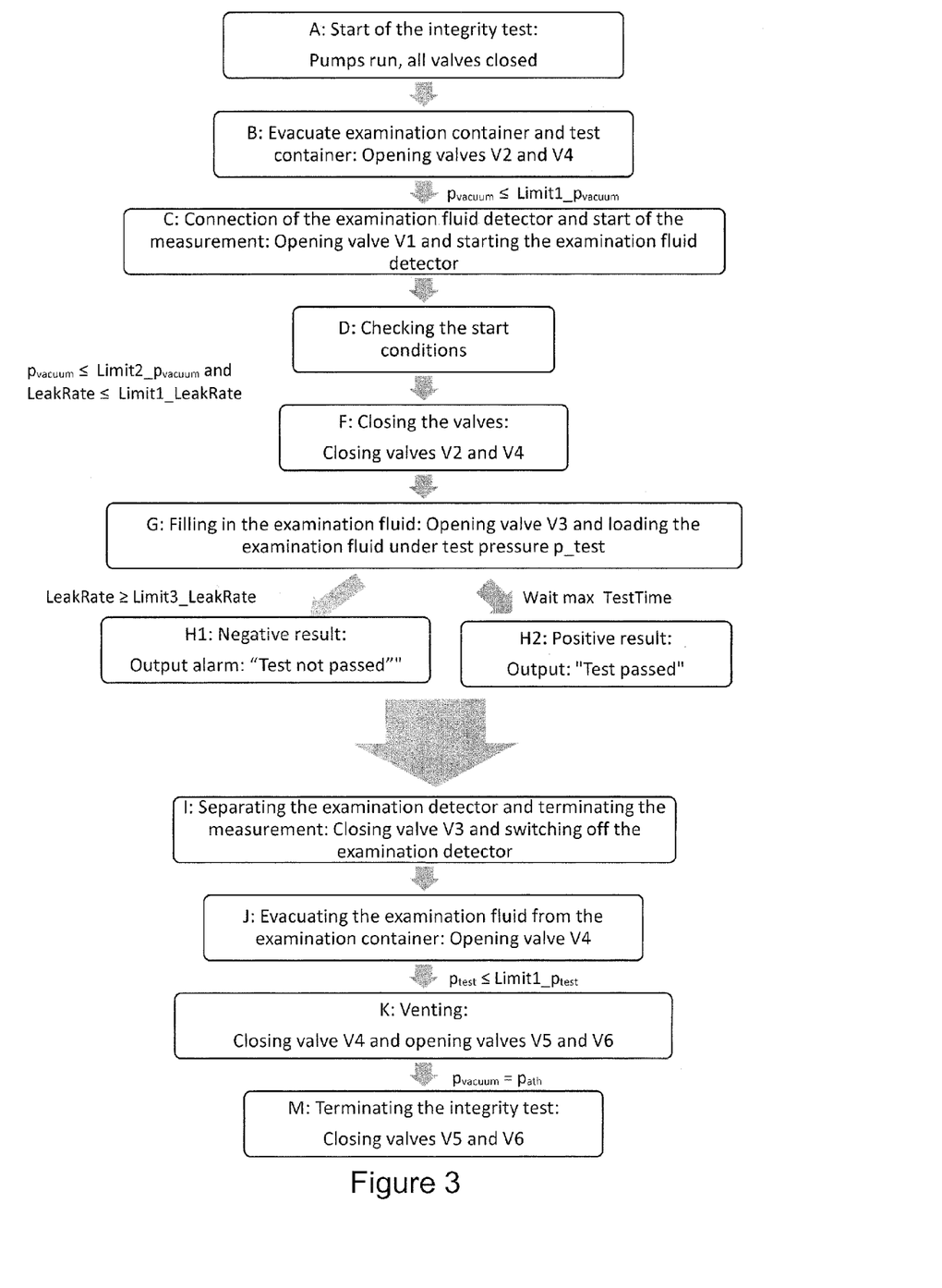
FIG. 3 a flow chart of a first method for conducting an integrity test on a flexible test container.

The process sequence of the corresponding test method is shown in a schematic process diagram in FIG. 3. In this process diagram, individual method steps of a method for conducting an integrity test on a flexible test container are depicted, which in the process diagram of FIG. 3 are shown to control the test device 10 illustrated in FIG. 1.

The integrity test starts in method step A. At the beginning, all pumps of the test device, in particular the examination container pump 4 and the test container pump 6, are operating. Moreover, at the beginning of the process, all valves of the test device 10 are closed.

In method step B, both the examination container 5 and the test container 1 are emptied, more precisely negative pressure with respect to atmospheric pressure, e.g. a high vacuum, is provided in these two containers. This takes place by opening the examination container pump valve V2 and the test container pump valve V4, whereby the two pumps 4 and 6 are switched on. The evacuation of the test container 1 takes place in parallel to the evacuation of the examination container 5. Here, a continuously lower negative pressure may be formed in the test container 1 and in the examination container 5 in order to prevent a collapse of the test container and thus a potential inclusion of residual air from the examination container.

If a predetermined and/or predeterminable negative pressure as vacuum pressure pvacuum is reached in the examination container, the examination fluid detector 2 is switched on via the detector valve V1 in method step C. This takes place when the vacuum pressure in the examination container 5 is smaller than or equal to a predetermined and/or predeterminable first pressure limit Limit1_pvacuum. pvacuum refers to the pressure in the examination container 5. In method step C, a background leak rate is recorded by a pre-measurement of the examination fluid concentration in the interior of the examination container 5. The first pressure limit Limit1_pvacuum can be determined based on the operating pressure of the examination fluid detector 2. The measurement of the examination fluid concentration in the examination container 5 starts as the pre-measurement of the background leak rate, also referred to as background concentration, already prior to the actual main measurement.

In method step D, it is checked whether the start conditions for the main measurement are met. Here, it may in particular be checked whether the predetermined negative pressure, in particular a predetermined high vacuum, is reached in the examination container, i.e. if pvacuum≤Limit2_pvacuum holds, where Limit2_pvacuum defines a second pressure limit as an admissible minimum limit for the pressure in the interior of the examination container. Further, it can be checked whether a maximally admissible background leak rate is fallen below, i.e. whether LeakRate≤Limit1_LeakRate holds, where LeakRate refers to the actually measured background leak rate in the examination container 5 and Limit1_LeakRate refers to a first admissible leak rate for the background leak rate.

If all start conditions are met, the valves V2 and V4 will be closed in method step F in order allow starting the leak test with the main measurement.

During the method step G, the examination fluid is filled into the test container 1. Here, the test container 1 is filled with examination fluid by opening of the test container valve V3 and brought to a predetermined and/or predeterminable test pressure p_test. This can take place in a split second, e.g. by a suitable pressure-volume ratio between the test container 1 and the preloaded examination fluid source 3. This kind of filling, i.e. pressure filling with preloaded examination fluid from an examination fluid source, allows a quick start of the main measurement prior to the beginning of permeation. The background leak rate increase occurs almost immediately in the case of a defect of the test container 1, the increase by permeation occurs slightly delayed. This delay depends on the examination fluid chosen and on the barrier behavior of the test container walls.

The actual main measurement begins with method step H. The test container 1 is evaluated in method step H. After a predetermined and/or predeterminable test time TestTime expires without exceeding a third leak rate, the test container 1 is assessed to be leakproof (method step H2). If the third leak rate Limit3_LeakRate in the examination container 5 is exceeded, the test container 1 will be assessed to be defect (method step H1). Here, the process can be interrupted already before the test time elapses in order to avoid an increased contamination of the examination container 5.

In method step I, the examination fluid detector 2 is decoupled and the main measurement is stopped. The examination fluid detector 2 is decoupled by closing of the detector valve V1, which terminates the measurement.

Subsequently, the examination fluid is evacuated in method step J. Here, the examination fluid is evacuated from the test container 1 by opening of the test container pump valve V4.

If a predetermined and/or predeterminable test container pressure ptest in the test container 1 is fallen below (and the condition ptest≤Limit1_ptest is met, where Limit1_ptest defines a pressure limit of the test container pressure) and thus almost the complete test gas is evacuated, the test device 10 is vented in method step K. Here, the test container pump valve V4 is closed and the complete system of the test device, i.e. the examination container cycle and the test container cycle, is vented to atmospheric pressure by opening of the valves V5 and V6.

After the examination container pressure pvacuum has reached the atmospheric pressure path, the valves V5 and V6 are closed and the test device 10 is set to the starting position in method step M.

Figure 2:
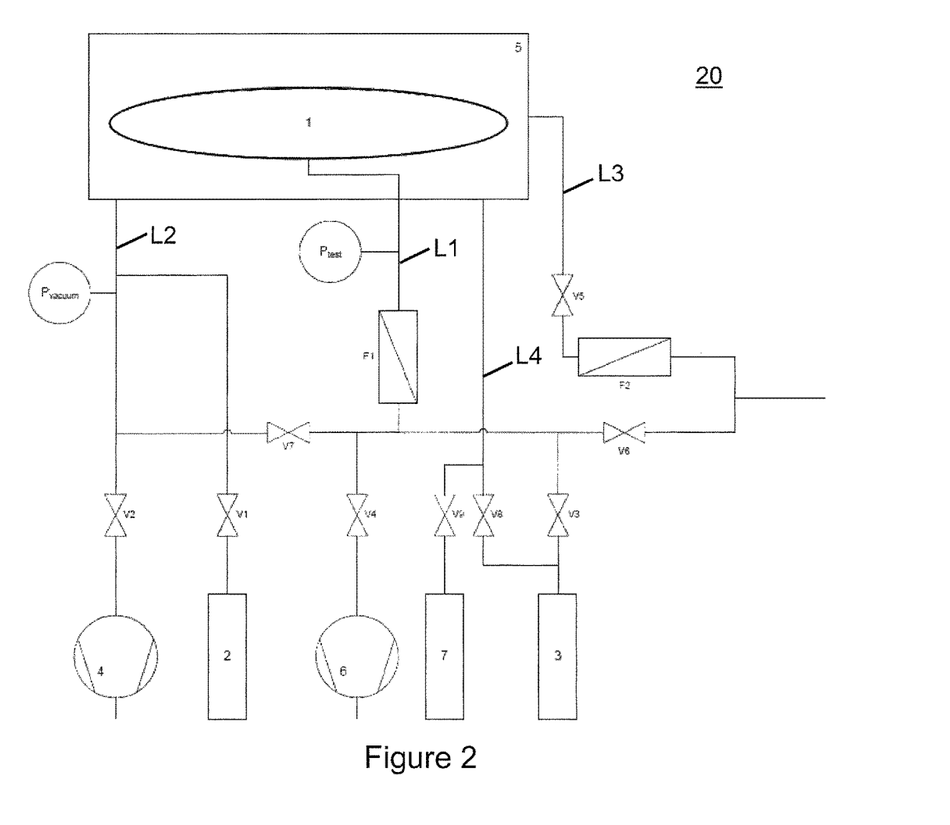
FIG. 2 a schematic illustration of a second test device for conducting an integrity test on a flexible test container.

FIG. 2 shows a schematic illustration of a second test device 20 for conducting an integrity test on a flexible test container 1.

The second test device 20 comprises all components of the first test device 10. The corresponding components of the two test devices have the same reference numerals.

The second test device 20 comprises some additional components, which provide different and mutually independent additional functions of the second test device 20 compared to the first test device 10.

A first additional function is provided by a flushing fluid source 7. A preloaded flushing fluid is arranged in the flushing fluid source 7, with which it is possible to flush away a contamination of the examination container due to permeation or a defect by the examination fluid.

The flushing fluid can be introduced into the interior of the examination container 5 via a flush valve V9 and a flush line L4 from the flushing fluid source 7. Thus, the components flushing fluid source 7, flush valve V9, and flush L4 enable a flush function as a first additional function. Flushing takes place via the flush line V4, through the examination container 2, wherein the examination fluid present and the flushing fluid are flushed out of the examination container 2 through the opened vent valves V5 and V6 and the isolation valve V7 via the lines L2 and L3.

As an alternative to the connection via the flush line L4, the flushing fluid source 7 might be coupled to a different line, e.g. to the examination container supply line L2, via the flush valve V9. In this embodiment, the examination fluid present and the flushing fluid would be flushed out of the examination container 2 through the opened examination container vent valve V5 via the line L3. Here, the isolation valve V7 can be closed to provide a defined flushing cycle through the examination container 2.

A second additional function of the second test device 20 is provided by means of an additional connection of the flushing fluid source 3 into the interior of the examination container 5 via an examination fluid inlet valve V8. In the embodiment shown in FIG. 2, coupling takes place via the flush line L4, alternatively, coupling might also be performed via one of the other supply lines or a further additional supply line.

The second additional function allows setting a background concentration (and thus also background leak rate) of examination fluid in the interior of the examination container 5, which may possibly accelerate the start of the examination process.

A connection between the test container supply line L1 and the examination container supply line L2, which can be controlled via an isolation valve V7, allows at least temporary pressure compensation between the test container 1 and the examination container 5 as a third additional function. Possibly present residual air inclusions in a collapsed test container 1 may lead to a marginal pressure difference with respect to the examination container 5 and thus to a complete evacuation of the test container 1. By means of the at least temporary pressure compensation, the pressure difference between the test container and the examination container is kept as small as possible.

The test device 20 shown in FIG. 2 serves to repeatedly conduct an integrity test on a flexible, exchangeable test container 1. The course of the corresponding test method for controlling the second test device 20 is shown in a schematic flow diagram in FIG. 4. The individual method steps for controlling the second test device 20 substantially correspond to the method steps shown in FIG. 3. However, the three additional functions of the second test device 20 allow performing some additional method steps and extending some of the above-described method steps.

Figure 4:
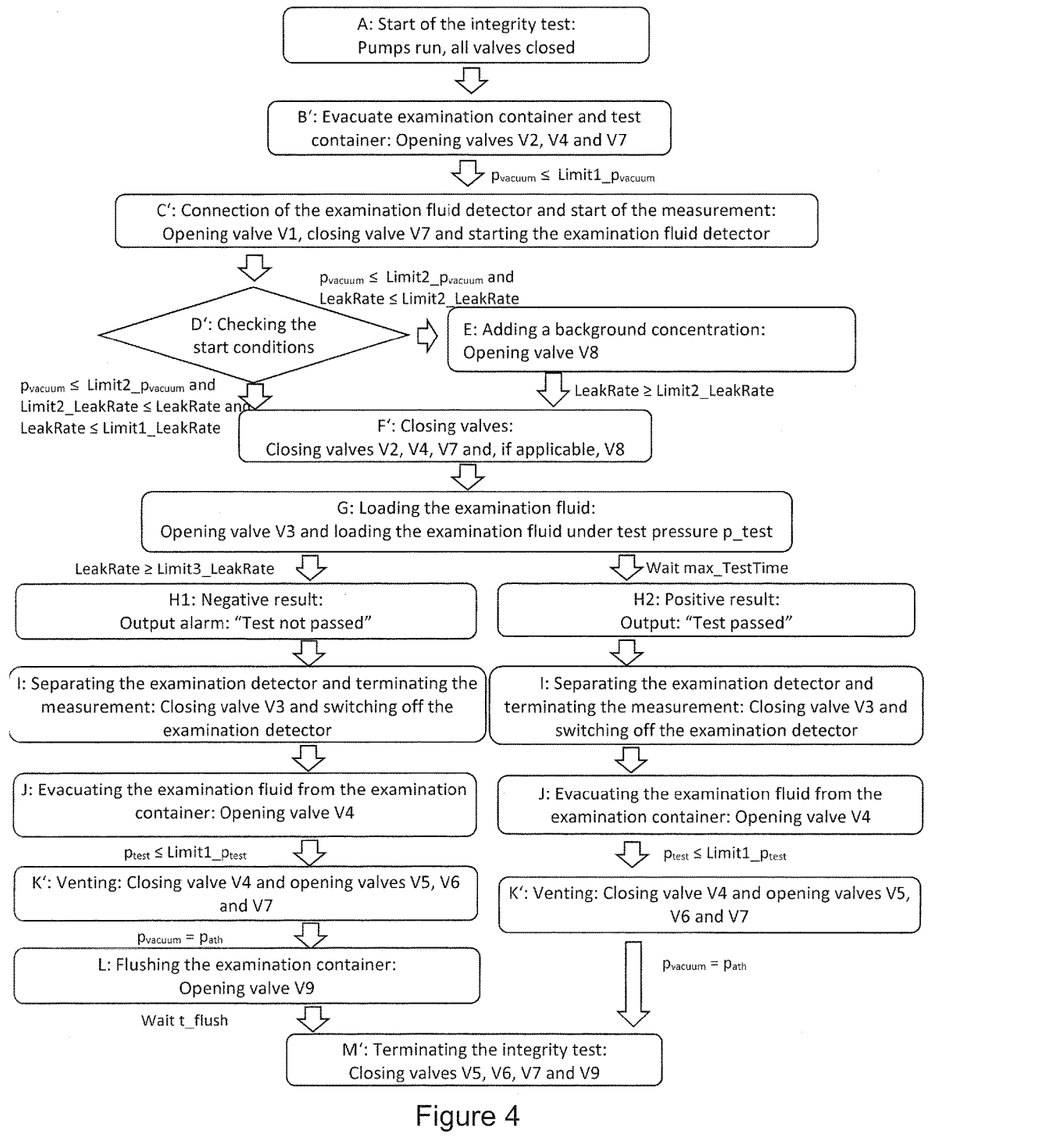
FIG. 4 a flow chart of a second method for conducting an integrity test on a flexible test container.

In the following, only the additional and modified method steps with respect to the above-method steps will be described. The modified method steps are marked by a stroke (such as B' compared to B), the additional method steps are marked by a new letter (here method steps E and L).

In method step B', when the examination container 5 and the test container 1 are emptied, the examination container cycle and the test container cycle are short-circuited via the isolation valve V7 in order to avoid positive pressure in the test container 1 and thus possible damage thereof. Thus, by opening of the isolation valve V7, at least a temporary pressure compensation between the interior of the test container 1 and the interior of the examination container 5 takes place. In this way, equally high negative pressure is provided in the two containers, wherein the absolute pressure in the test container may be marginally higher than the absolute pressure in the examination container, e.g. between 0 mbar and 100 mbar, or between 0 mbar and 10 mbar. Possibly present residual air inclusions in a collapsed test container 1 can lead to a marginal pressure difference with respect to the examination container 5 and thus to a complete evacuation of the test container 1.

In method step C', the isolation valve V7 is closed in addition, whereby the two cycles are separated from each other.

In method step D', i.e. when the start conditions are checked, a coordinated reaction occurs in response to different measurement results in the pre-measurement. i.e. before the main measurement begins. In some cases, it may be that the evacuation to the negative pressure in the examination container 5, in particular to a high vacuum, takes a long time (e.g. due to gas release from the test container 1). In this case, the background leak rate in the examination container 5 may also drop sharply. Although this has not a negative effect on the measurement in principle, the dynamic increase in the background leak rate at the beginning of the main measurement is varied thereby as well. Depending on the evaluation method, it may be advantageous for the background leak rate to be in a defined window at the beginning of the main measurement. If this window is fallen below, examination fluid can be introduced into the examination container 5 accordingly.

When the background leak rate LeakRate falls below a second leak limit Limit2_LeakRate, a method step E is performed. In method step E, the examination fluid background concentration in the examination container 5 is increased. To this end, the examination fluid inlet valve V8 is opened until the start condition LeakRate≤Limit2_LeakRate is met as well.

In method step F', the isolation valve V7 and optionally the examination fluid inlet valve V8 is/are closed to provide for the readiness to perform the main measurement and leak test.

The method steps G, H, I, and J correspond to the above-described method steps.

In the venting process in method step K', the isolation valve V7 can be opened in addition in order to allow a more thorough and fast venting.

In the case of a negative test object evaluation in method step H1 and the contamination of the examination container 5 involved, additional flushing is performed in method step L. By opening the flush valve V9, the complete examination container cycle is flushed via the opened valves V5, V7, and V6 and the lines L2, L4, and L3.

Accordingly, when the process is terminated, valves V7 and V9 are closed in addition in method step M'.

Figure 5:
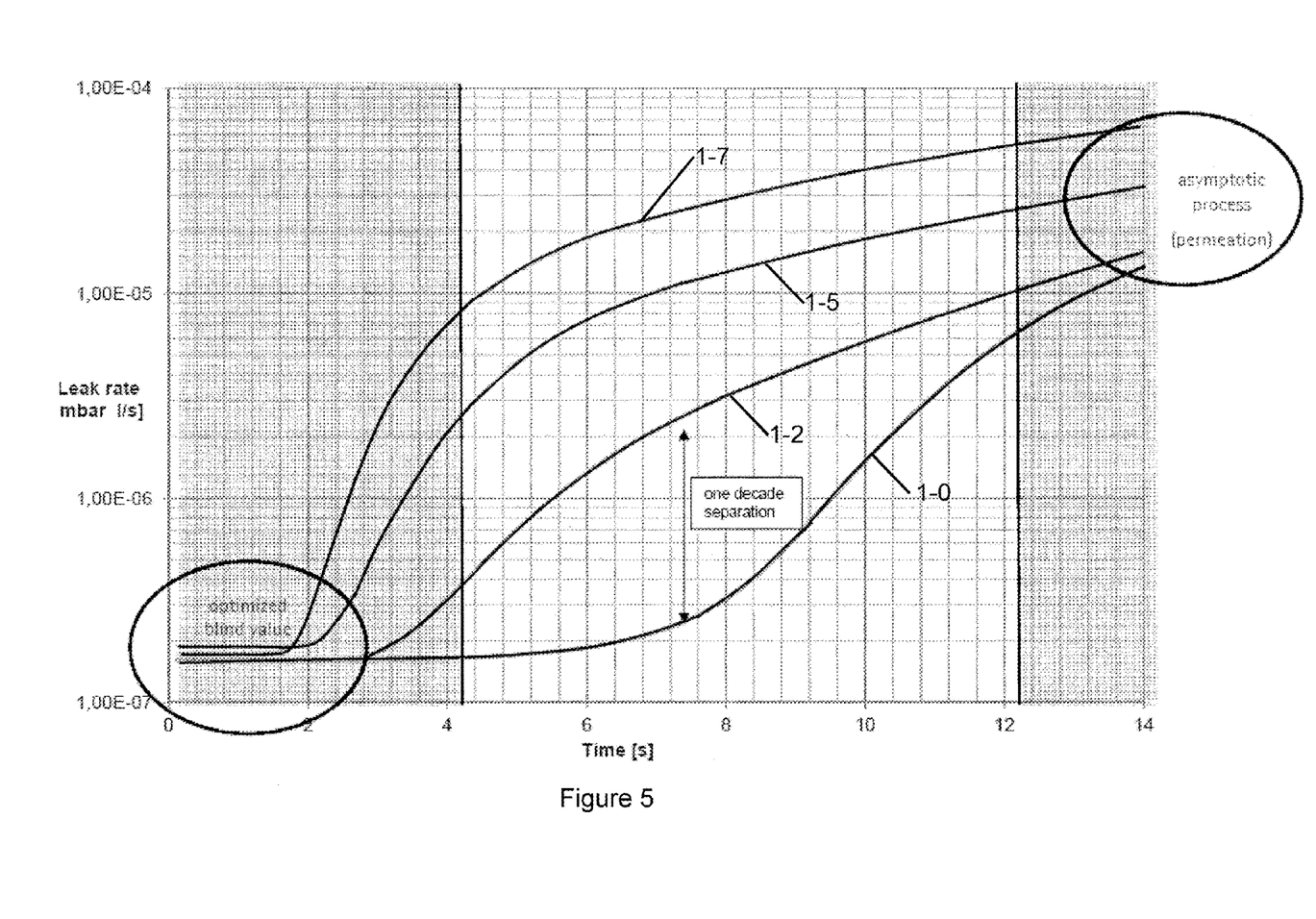
FIG. 5 a diagram of a time course of the expected examination fluid concentration in the examination container of intact and defect test containers.

FIG. 5 shows a diagram with several time courses of the expected examination fluid concentration in the examination container for four different test containers.

A first time course 1-0 shows the expected concentration ("Leak rate in mbar*l per s") of helium as the examination gas of an intact test container. The main measurement starts after about 4 seconds, during which the concentration of the background leak rate below $2*10^{-7}$ mbar*l/s increases slowly to $6*10^{-6}$ mbar*l/s after about 12 seconds (corresponds to max_TestTime).

A second time course 1-2 shows the expected concentration of helium as the examination gas of a test container having a leak of about 2 µm in diameter. Here, the concentration increases above the background leak rate to about $4*10^{-7}$ mbar*l/s after about 4 seconds already before the actual main measurement begins (i.e. prior to method step H, already during method step G). In the course of the test time during the main measurement, the concentration increases to about $1*10^{-5}$ mbar*l/s after about 12 seconds.

A third time course 1-5 shows the expected concentration of helium as the examination gas of a test container having a leak of about 5 µm in diameter. Here as well, the concentration increases above the background leak rate to about $2.3*10^{-6}$ mbar*l/s after about 4 seconds already before the actual main measurement begins. In the course of the test time, the concentration increases to about $2.3*10^{-5}$ mbar*l/s after about 12 seconds.

A fourth time course 1-7 shows the expected concentration of helium as the examination gas of a test container having a leak of about 7 µm in diameter. Here, the concentration increases above the background leak rate to about $8*10^{-6}$ mbar*l/s after about 4 seconds before the actual main measurement begins. In the course of the test time, the concentration increases to about $5*10^{-5}$ mbar*l/s after about 12 seconds.

The main measurement might already start at the time t=0 s as well. In the illustrated embodiment, the range between t=4 s and t=12 s is a predetermined test time range during which reliable differentiation between defect and defect-free test containers is possible.

Depending on the evaluation method, in the case of a defective test container as the test object, the measurement might possibly be terminated already before the test time expires, e.g. when a concentration course is detected in addition to the absolute value.

LIST OF REFERENCE NUMERALS 1 test container
2 examination fluid detector
3 examination fluid source
4 examination container pump
5 examination container
6 test container pump
7 flushing fluid source
10 first test device
20 second test device
F1 test container filter
F2 examination container filter
L1 test container supply line
L2 examination container supply line
L3 vent line
L4 flush line
V1 detector valve
V2 examination container pump valve
V3 examination fluid vale
V4 test container pump valve
V5 examination container vent valve
V6 test container vent valve
V7 isolation valve
V8 examination fluid inlet valve
V9 flush valve
$p_{test}$ test container pressure
$p_{vacuum}$ examination container pressure

What is claimed is:

1. A method for conducting an integrity test on a flexible test container (1), comprising:
    arranging the test container (1) in an interior of an examination container (5) that is sealable in a fluid-tight manner;
    providing negative pressure in the interior of the sealed examination container (5);
    providing negative pressure in the test container (1) arranged in the examination container (5), the negative pressure in the test container (1) being provided before and during the step of providing negative pressure in the interior of the sealed examination container (5), the negative pressure in the test container (1) being lower than the negative pressure in the interior of the examination container (5) and being selected so that a pressure difference between the negative pressure in the test container (1) and the negative pressure in the interior of the sealed examination container (5) is more than 0 mbar and a maximum of 100 mbar;
    filling examination fluid into the test container (1) arranged in the examination container (5); and
    detecting whether any of the examination fluid is present in the interior of the examination container (5).

2. The method of claim 1, wherein the step of providing negative pressure in the test container (1) is carried out prior to filling the examination fluid into the examination container (5) so that the negative pressure in the test container (1) is 0 mbar to 10 mbar lower than the negative pressure provided in the examination container (5).

3. The method of claim 1, wherein the step of providing negative pressure in the test container (1) and the step of providing negative pressure in the interior of the examination container (5) are carried out substantially at the same time, wherein during the provision of the two negative pressures, the negative pressure in the test container (1) is maintained continuously lower than the negative pressure in the interior of the sealed examination container (5).

4. The method of claim 1, wherein during the steps of providing the negative pressures in the test container (1) and in the examination container (5), the level of the negative pressure in the test container (1) is matched to the level of the negative pressure in the examination container (5).

5. The method of claim 4, wherein during the steps of providing the negative pressures in the test container (1) and in the examination container (5), at least temporary pressure compensation takes place between the interior of the test container (1) and the interior of the examination container (5).

6. The method of claim 4, wherein the matching between the negative pressure in the interior of the test container (1) and the negative pressure in the interior of the examination container (5) comprises
    matching between an examination container pump (4) for pumping off the interior of the sealed examination container (5) and a test container pump (6) for pumping off the interior of the test container (1), and/or
    operating an isolation valve (V7).

7. The method of claim 1, wherein the step of filling the examination fluid into the test container (1) comprises filling examination fluid from a preloaded examination fluid source (3).

8. The method of claim 1, further comprising terminating the method as soon as the examination fluid concentration in the examination container (5) exceeds a predetermined leak limit (Limit3_LeakRate) and rating the test container (1) as being defective.

9. The method of claim 1, further comprising flushing the interior of the examination container (5) after examination fluid has been detected in the examination container (5).

10. The method of claim 1, further comprising setting a background concentration of examination fluid in the examination container (5).

11. A method for conducting an integrity test on a flexible test container (1), comprising:
    arranging the test container (1) in an interior of an examination container (5) that is sealable in a fluid-tight manner;
    providing negative pressure in the interior of the sealed examination container (5);
    providing negative pressure in the test container (1) arranged in the examination container (5), the negative pressure in the test container (1) be lower than the negative pressure in the interior of the examination container (5) and being selected so that a pressure difference between the negative pressure in the test container (1) and the negative pressure in the interior of the sealed examination container (5) is more than 0 mbar and a maximum of 100 mbar;
    filling examination fluid into the test container (1) arranged in the examination container (5);
    detecting whether any of the examination fluid is present in the interior of the examination container (5); and
    increasing an examination fluid background concentration in the examination container (5) when a background leak rate (LeakRate) in the examination container (5) falls below a predetermined leak limit (Limit2_LeakRate).

12. The method of claim 11, wherein the step of providing the negative pressure in the test container (1) is carried out before and during the step of providing negative pressure in the interior of the examination container (5).

13. A method for conducting an integrity test on a flexible test container (1), comprising:
  arranging the test container (1) in an interior of an examination container (5) that is sealable in a fluid-tight manner;
  providing negative pressure in the interior of the sealed examination container (5);
  providing negative pressure in the test container (1) arranged in the examination container (5), the negative pressure in the test container (1) be lower than the negative pressure in the interior of the examination container (5) and being selected so that a pressure difference between the negative pressure in the test container (1) and the negative pressure in the interior of the sealed examination container (5) is more than 0 mbar and a maximum of 100 mbar;
  filling examination fluid into the test container (1) arranged in the examination container (5); and
  detecting whether any of the examination fluid is present in the interior of the examination container (5), wherein the negative pressure in the test container (1) is provided via a supply line (L1), via which the examination fluid is filled into the test container.

14. A test device (10; 20) for conducting an integrity test on a flexible test container (1), comprising:
  an examination container (5) that is sealable in a fluid-tight manner, in which the test container (1) is arrangeable;
  an examination container pump (4) for pumping off the interior of the sealed examination container (5) to achieve a negative pressure;
  an examination fluid source (3), from which examination fluid can be filled into the test container (1) arranged in the examination container (5);
  an isolation valve (V7) between the interior of the test container (1) and the interior of the examination container (5);
  an examination fluid detector (2) for detecting examination fluid in the interior of the examination container (5); and
  a pump connection, via which the interior of the test container arranged in the examination container (5) can be pumped off such that the negative pressure in the test container (1) is lower than the negative pressure in the interior of the sealed examination container (5), wherein the pressure difference between the negative pressure in the test container (1) and the negative pressure in the interior of the sealed examination container (5) is more than 0 mbar and a maximum of 100 mbar.

* * * * *